United States Patent [19]
Koenig

[11] Patent Number: 5,112,703
[45] Date of Patent: May 12, 1992

[54] ELECTROCHEMICAL BATTERY CELL HAVING A MONOLITHIC BIPOLAR FLAT PLATE BETA″ ALUMINA SEPARATOR

[75] Inventor: Albert Koenig, Coatesville, Pa.

[73] Assignee: Beta Power, Inc., Salt Lake City, Utah

[21] Appl. No.: 547,302

[22] Filed: Jul. 3, 1990

[51] Int. Cl.$^5$ .......................................... H01M 10/39
[52] U.S. Cl. .................................. 429/103; 429/104; 429/193
[58] Field of Search ............... 429/101, 103, 104, 191, 429/193, 105, 107

[56] References Cited

U.S. PATENT DOCUMENTS

| | | | |
|---|---|---|---|
| 2,471,781 | 5/1949 | Schmidt | 429/225 |
| 3,756,856 | 9/1973 | Tennenhouse | 429/104 |
| 4,239,839 | 12/1980 | McDowall et al. | 429/154 |
| 4,894,299 | 1/1990 | Morse | 429/104 |

FOREIGN PATENT DOCUMENTS 1344069 11/1970 United Kingdom .
1327604 12/1970 United Kingdom .

OTHER PUBLICATIONS

A Sodium-Sulfur Test Cell Utilizing A β-Alumina Flat-Plate Separator, L. S. Marcoux, R. R. Sayano, E. T. Seo and H. P. Silverman.

Primary Examiner—William R. Dixon, Jr.
Assistant Examiner—Deborah Jones
Attorney, Agent, or Firm—Finnegan, Henderson, Farabow, Garrett & Dunner

[57] ABSTRACT

A separator for use in an advanced rechargeable electrochemical battery cell includes a thin plate of beta″ alumina affixed to a molded monolithic frame shaped similar to a window frame. The strength and support provided by the frame permits use of extremely thin beta″ alumina plates. When used in a sodium sulfur or sodium metal chloride battery cell, the separator permits maximum cell power without a decrease in cell energy capacity. A battery prepared by stacking a plurality of such cells is light and compact, yet has sufficient power and capacity for use in an electric vehicle.

41 Claims, 7 Drawing Sheets

ELECTROCHEMICAL BATTERY CELL HAVING A MONOLITHIC BIPOLAR FLAT PLATE BETA" ALUMINA SEPARATOR

This invention was made with U.S. Government support under contract N00014-88-C-0485, awarded by the Department of the Navy. The Government has certain rights in this invention.

FIELD OF THE INVENTION

The present invention relates to rechargeable batteries, and more particularly to electrochemical batteries and the separator used therein. While the invention is suitable for use in a wide range of electrochemical batteries, it is especially suitable for use in sodium sulfur and sodium metal chloride batteries using beta" alumina separators, and will be particularly described in that connection.

BACKGROUND OF THE INVENTION

Description of the Related Art

In the present era of heightened environmental concerns, electric-powered automobiles and similar vehicles are being considered as a highly desirable method of transportation. Existing battery technology, however, has limited the ability of vehicle manufacturers to produce marketable electric vehicles. Vehicle manufacturers desire a battery having sufficient stored energy capacity to allow the vehicle to travel an acceptable range between charging, while at the same time having acceleration and power characteristics similar to those of internal combination engines. Furthermore, vehicle manufacturers do not wish to sacrifice such marketable characteristics as vehicle size, appearance, and luxury features in order to reduce the load on the battery.

As noted above, existing battery technology is inadequate to meet these needs. Lead acid batteries, which are commercially available today, would by their very weight and size diminish the range capability of the resultant electric vehicle (EV).

Electrochemical batteries have been explored as possible alternatives to lead acid batteries, for example, sodium sulfur batteries and sodium metal chloride batteries. Sodium sulfur batteries utilize a sodium anode and sulfur cathode, separated by an ion-permeable electrolyte of beta" alumina. Sodium sulfur batteries have a high volumetric and gravimetric energy density compared to lead acid batteries.

To date, however, while sodium sulfur batteries may possess adequate stored energy capacity to allow a vehicle to travel long distances between charging, these batteries leave the EV underpowered. Prototype electric vehicles have displayed either relatively poor acceleration or poor range, depending on battery design preference. This result has placed an emphasis on simultaneously increasing the power and energy characteristics of these batteries.

The only way to accomplish this design task is by reducing the internal cell resistance. In order to reduce internal cell resistance in a sodium sulfur cell, the beta" alumina separator thickness must be reduced, thereby making it easier for sodium ions to migrate from the anode to the cathode. However, previous attempts to reduce separator thickness have resulted in excessive fragility, causing the beta" alumina to fracture easily, resulting in an impractical device.

At the same time, it remains desirable to maximize cell size (which is related to stored energy capacity), while keeping the overall battery as compact as possible. Related attempts to manufacture tubular battery cells have resulted in batteries with relatively thick beta" alumina separators (resulting in high internal resistance and reduced power), or small cells (resulting in low energy capacity and reduced vehicle range).

OBJECTS OF THE INVENTION

For the foregoing reasons, it is an object of the present invention to provide an electrochemical battery cell having an electrolyte separator which is extremely thin, yet retains sufficient strength to provide reliability.

It is also an object of the present invention to provide an electrochemical battery cell having an electrolyte separator with reduced internal resistance, thereby increasing available battery cell power, without sacrificing battery energy storage.

It is a further object of the invention to provide an electrochemical battery cell which is compact and lightweight.

It is a further object of the invention to provide a battery cell which is stackable with other identical battery cells.

It is a further object of the invention to provide an electrochemical battery cell which is easy and inexpensive to manufacture.

It is a further object of this invention to provide an electrochemical battery cell which is safe to operate.

SUMMARY OF THE INVENTION

To achieve the foregoing objects, and in accordance with the purposes of the invention as embodied and broadly described herein, an electrochemical battery cell includes a flexible beta" alumina plate serving as an electrolyte; a rigid frame means for supporting the beta" alumina plate, including an outer peripheral portion and at least one central portion defining at least two adjoining generally rectangular openings, the frame means having planar surfaces on opposite sides, the beta" alumina plate being fixed to one surface of the frame means; a cathode compartment disposed on one side of the frame means and beta" alumina plate partially enclosing a cathode; an anode compartment disposed on the opposite side of the frame means and beta" alumina plate partially enclosing sodium; and a metallic seal plate sealing the anode compartment, the seal plate including an electric current collector.

In accordance with the invention as embodied and broadly described herein, there is further provided transferring means disposed in the anode compartment to transfer the sodium to the beta" alumina plate. Preferably, the transferring means includes a honeycomb structure having a plurality of pores for releasing the sodium at a controlled rate to the beta" alumina plate.

In accordance with the invention, the electrochemical battery cell broadly described herein is preferably a sodium metal battery cell, such as a sodium sulfur battery cell, sodium nickel chloride battery cell, sodium iron chloride battery cell, or other sodium metal chloride battery cell.

In accordance with the invention, the cathode compartment includes a metal frame seal attached to the periphery of the frame for attaching to a successive metallic seal plate.

In accordance with the invention, the battery cells can be stacked and electrically connected to form a battery.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and comprise a part of the specification, illustrate a preferred embodiment of the invention, and together with the broad description of the preferred embodiments given below, serve to explain the principles of the invention.

DESCRIPTION OF THE PREFERRED EMBODIMENTS

Reference will now be made in detail to the preferred embodiments of the invention as illustrated in the accompanying drawings.

In accordance with the invention, an electrochemical battery cell includes a separator, the separator including a flexible beta alumina" plate, having opposite surfaces, and a rigid frame means.

Figure 1:
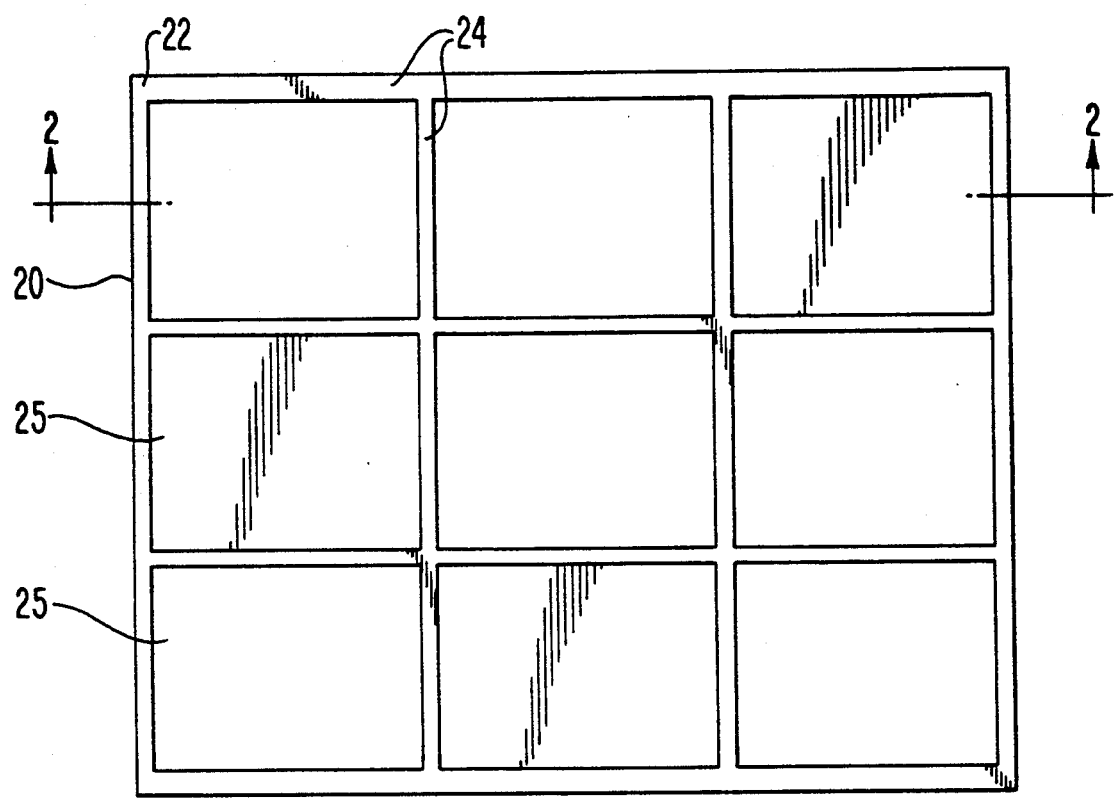
FIG. 1 is a plan view of one embodiment of a monolithic bipolar flat plate frame mounting a beta" alumina separator plate in accordance with the invention.
Figure 2:
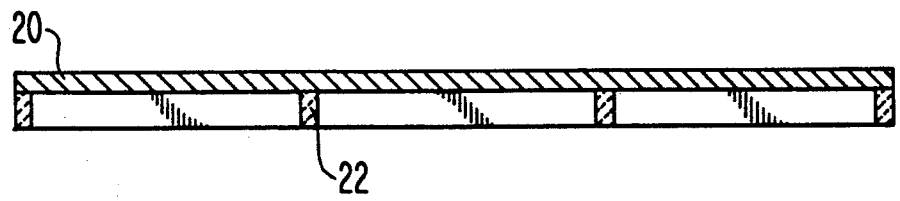
FIG. 2 is a cross-sectional view of the embodiment of a monolithic bipolar flat plate frame and beta" aluminum separator plate of FIG. 1.

As embodied in FIGS. 1 and 2, beta" alumina plate 20 has a generally flat rectangular shape, and is manufactured using a technique such as tape casting, as is known in the art, with subsequent blanking to provide a discretely-sized plate.

In accordance with the invention, the separator also includes a rigid frame means for supporting the beta" alumina plate. Preferably, the frame means includes a planar frame. As embodied in FIGS. 1 and 2, frame 22 is a flat monolithic structure having one or more integral or separate portions 24 molded to form a pattern similar to a "window pane", defining a plurality of adjoining generally rectangular openings 25. Beta" alumina plate is fixed at its peripheral edges to one side of frame 22, preferably with a conventional intermediate expansion glass seal. Rectangular portions of beta" alumina plate 20 are accessible through adjoining rectangular openings 25. When fixed to beta" alumina plate 20, frame 22 provides structural support to beta" alumina plate 20 for use as a separator in an electrochemical battery cell, allowing beta" alumina plate 20 to withstand bending moments generated during cell operation.

Preferably, frame 22 is molded as a single monolithic structure from a lightweight ceramic insulator material, such as alpha alumina. It is also preferable that beta" alumina plate 20 be glass bonded to frame 22 only along the outer peripheral portion of the plate.

Figure 3:
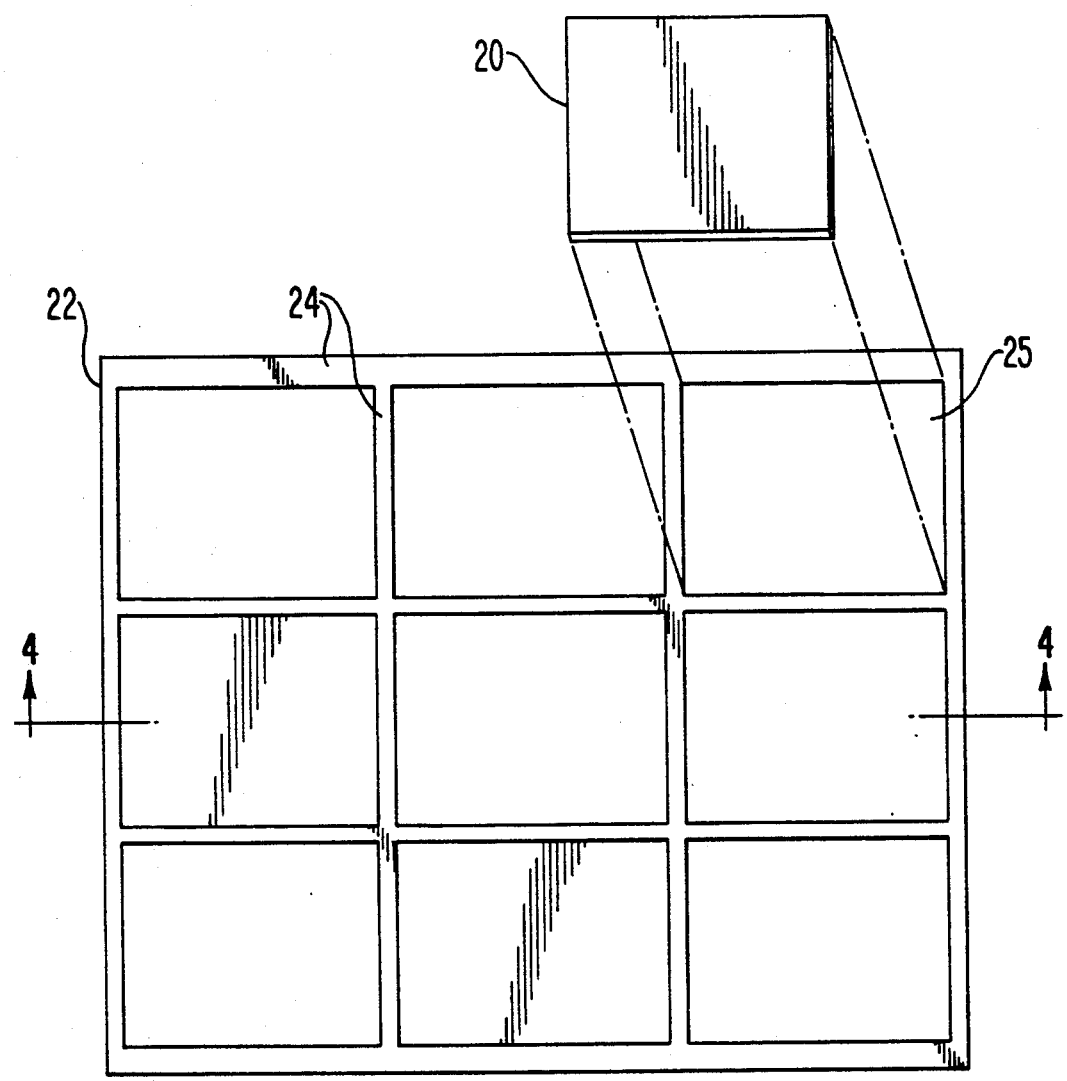
FIG. 3 is a plan view of another embodiment of a monolithic bipolar flat plate frame mounting a plurality of beta" alumina separator plates in accordance with the invention.
Figure 4:
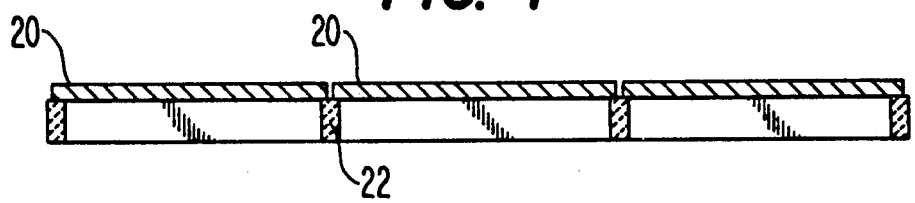
FIG. 4 is a cross-sectional view of the embodiment of FIG. 3, depicting one embodiment of mounting the plurality of beta" alumina plates over adjoining rectangular openings defined by the frame.
Figure 5:
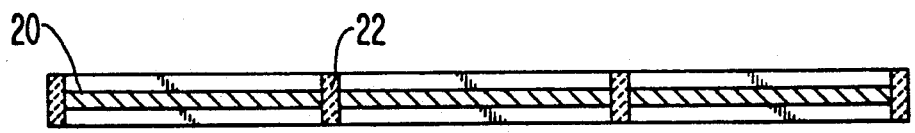
FIG. 5 is a cross-sectional view of the embodiment of FIG. 3, depicting another embodiment of mounting the plurality of beta" alumina plates within adjoining rectangular openings defined by the frame.

As broadly embodied in FIG. 3, the separator may include a plurality of smaller rectangular beta" alumina plates 20, each mounted to a corresponding opening 25 of frame 22. In this embodiment, the mounting of beta" alumina plates 20 to frame 22 may occur in several ways. For example, beta" alumina plates 20 may be glass bonded to cover respective openings 25, as embodied in FIG. 4. Alternatively, beta" alumina plates 20 may be fit and glass bonded within an inner periphery of openings 25, as embodied in FIG. 5. Other conventional techniques would also be within the scope of the invention, since in each case the beta" alumina plates 20 are strengthened and supported by being mounted on frame 22.

Figure 8:
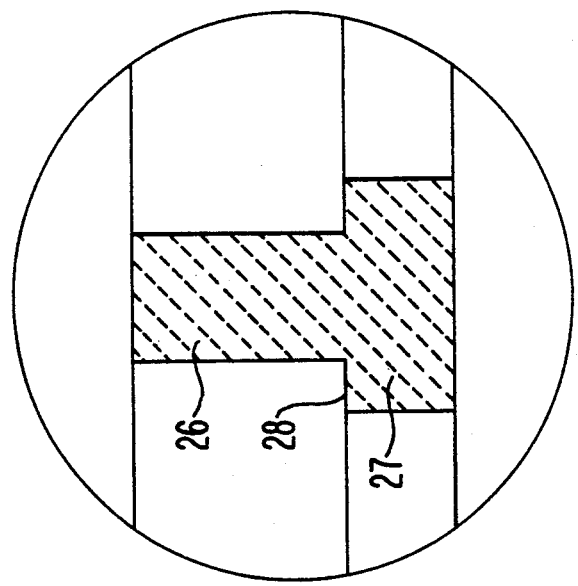
FIG. 8 is an enlarged partial view of the cross-section of FIG. 7, depicting the configuration of the frame of FIG. 6.
Figure 6:
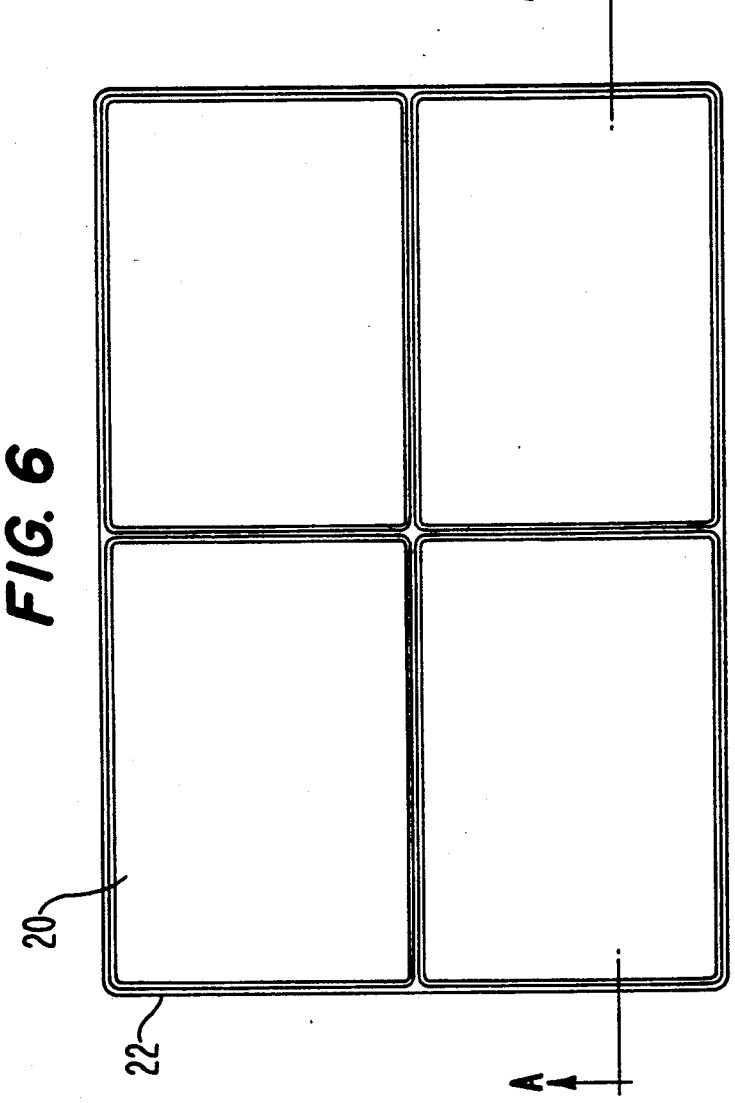
FIG. 6 is a plan view of yet another embodiment of a monolithic bipolar flat plate frame mounting a plurality of beta" alumina separator plates in accordance with the invention
Figure 7:
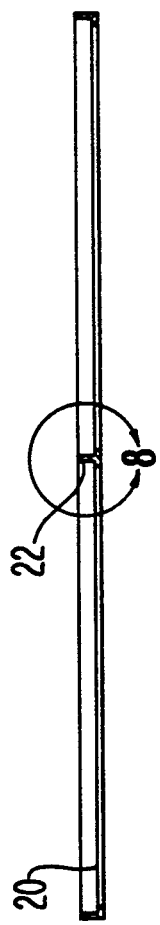
FIG. 7 is a cross-sectional view of the embodiment of FIG. 6, taken along line A—A.

In still another embodiment of the separator plate of the present invention, frame 20 is molded with a plurality of integral portions 24, each portion 24 having a configuration similar to that broadly embodied in FIGS. 6–8. As broadly described herein, the embodiment of frame 22 shown in FIGS. 6–8 includes portions 24 having an upper rectangular portion 26 and lower rectangular portion 27 joined together to define a plurality of generally L or T-shaped portions, having an inner peripheral ledge 28 extending continuously around the inner periphery of each adjoining rectangular opening 25. As shown in FIG. 7, the beta" alumina plates 20 are glass bonded to respective ledges 28 in each opening 25.

Figure 16:
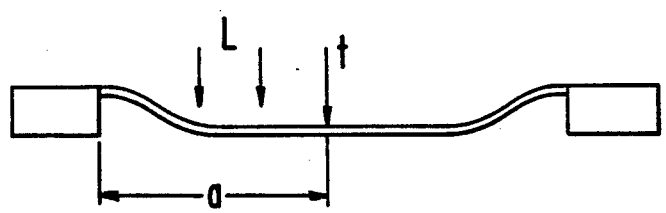

The separator plate described above provides several advantages when used in an electrochemical battery cell. Because of the support provided by the alpha alumina frame 22, each beta" alumina plate 20 can be manufactured extremely thin. The calculation of beta" alumina plate size is performed with reference to FIG. 16. Given a known strength of beta" alumina of 29 KSI, and assuming no other intermediate support, a radial stress ($S_r$) at the fixed edges of plate 20 is:

$$S_r = .75 L \left(\frac{a}{t}\right)^2 \quad (1)$$

For a sodium sulfur cell at a maximum operating temperature of 400° C., a differential pressure load of 7 psi may be experienced across beta" alumina plate 20. This gives a maximum allowable beta" alumina aspect ratio of $$\frac{a}{t} = 74. \quad (2)$$

Therefore, using equation (2) it can be seen that for a circular plate having a 5 cm diameter, the thickness can be reduced to 0.34 mm, without damage to the beta" alumina plate. This calculation can be approximated for a rectangular plate having a length x and width w by $$a = \sqrt{\frac{lw}{\pi}}. \quad (3)$$

The thinner configuration of beta" alumina plate or plates 20 can be used in a battery cell because of the support provided by rigid alpha alumina frame 22. Frame 22 provides rigidity and support by limiting the span of the electrolyte beta" alumina plate 20 to that of the plurality of rectangular openings 25 within frame 22. By effectively providing a plurality of small thin beta alumina electrolyte plates 20 on a single substrate, the packing density of an eventual battery can be enhanced. Furthermore, due to the thinness of beta" alumina plates 20, internal resistance to ion flow across the beta" alumina electrolyte is significantly reduced. It is necessary to maintain an assembly in which the ratio of free beta" alumina plate 20 area to overall frame 22 area is as large as possible. Therefore, the area of individual elongated members 24 defining frame 22 should be as narrow as possible, while still providing support to beta" alumina plates 20.

Additional benefits and technical advantages associated with use of a thin beta" alumina plate supported by a monolithic flat alpha alumina frame as a separator in an advanced rechargeable electrochemical battery, such as a sodium sulfur battery, or sodium metal chloride battery, shall be described in greater detail below.

Figure 9:
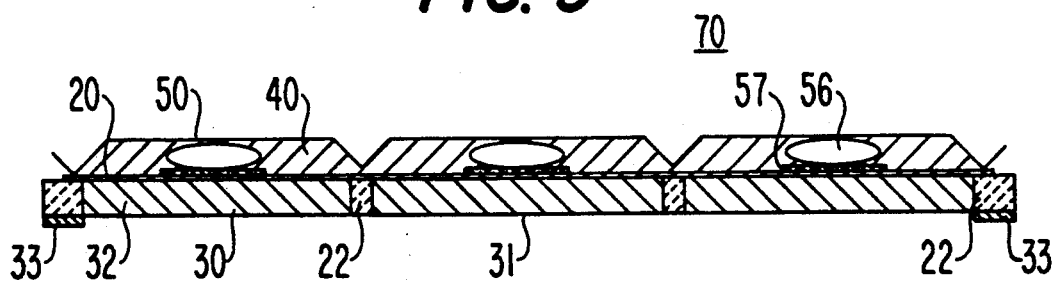
FIG. 9 is a cross-sectional view of a preferred embodiment of an electrochemical battery cell in accordance with the invention, using the frame and beta" alumina separator plate of FIG. 1.

In accordance with the invention, the electrochemical battery cell includes a cathode compartment provided on one side of the frame partially enclosing a cathode. As will be discussed below, the cathode is installed in the cell in a fully discharged state, thereby requiring free access to the cathode compartment. As embodied for example in FIG. 9, a cathode compartment 30 adjoins one surface of frame 22/beta alumina plate 20, which is open at an end 31 away from frame 22. Cathode compartment 30 partially encloses a cathode 32.

In a conventional sodium sulfur battery cell, the cathode 32 includes sulfur. A typical fully discharged sulfur cathode form which is contemplated includes a carbon fiber mat impregnated with sodium trisulfide.

Sodium metal chloride batteries are also within the scope of the present invention, utilizing nickel chloride, for example, as cathode 32. An example of such a nickel chloride in cathode form would be a sintered powder blend of nickel and sodium chloride with a sodium chloroaluminate electrolyte and a small amount of aluminum powder additive. Iron chloride is another acceptable cathode. Other metal chlorides can be used, including but not limited to copper chloride, cobalt chloride, and the like.

As broadly embodied herein, cathode compartment 30 utilizes a partial metal frame seal 33 attached to the periphery of the frame 22, and extending beyond the frame 22. The choice of material for cathode compartment metal frame seal 33 is determined by the particular cathode selected. In general, the metal selected for cathode compartment metal frame seal 33 should have an expansion coefficient which closely matches that of alpha alumina. Recommendations include thin ductile chromium or chrome plated molybdenum sheet for sulfur cathodes, and nickel, chrome or molybdenum substrates for nickel chloride cathodes.

Figure 10:
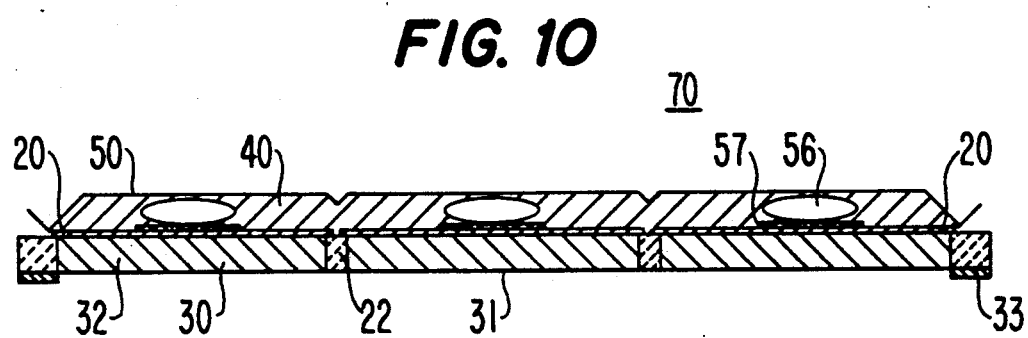
FIG. 10 is a cross-sectional view of another embodiment of an electrochemical battery cell in accordance with the invention, using the frame and plurality of beta" alumina separator plates of FIG. 3.
Figure 11:
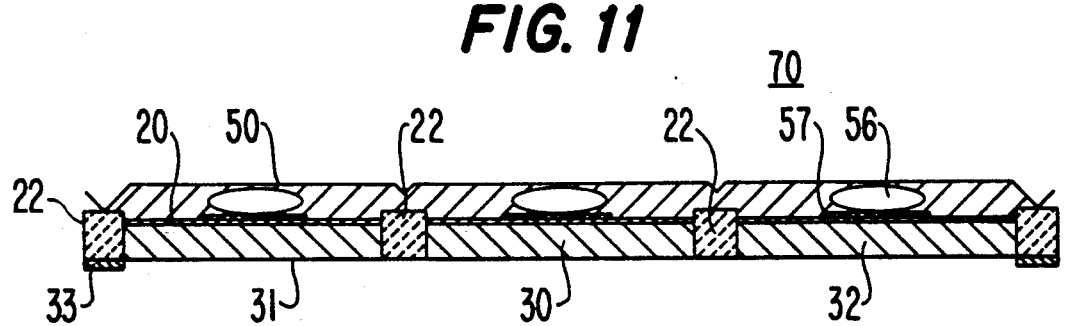
FIG. 11 is a cross-sectional view of yet another embodiment of an electrochemical battery cell in accordance with the invention, using the frame and beta" alumina separator plates of FIG. 5.

In accordance with the invention, the electrochemical battery cell includes an anode compartment disposed on the opposite side of the frame and beta" alumina plate, enclosing sodium. As embodied in FIGS. 9-10, anode compartment 40 is closed. This closure necessitates that the sodium be electrolyzed during the first charge into anode compartment 40. In this configuration, cathode 32 and the sodium in anode compartment 40 communicate through beta" alumina separator plate 20, which is permeable to sodium ions.

In accordance with the invention, a metal seal plate is provided to seal the anode compartment. As embodied in FIGS. 9-12, metal seal plate 50 is fixed to seal anode compartment 40 by thermal compression bonding. Seal plate 50 is sealed along the periphery of frame 22 only in the preferred embodiment, creating a common sodium reservoir. Seal plate 50 extends beyond the outer periphery of frame 22 for ease of welding. Seal plate 50 functions to seal anode compartment 40 and to transfer electric current from the battery cell during normal cell operation. For reasons to be discussed below, the criteria for selecting the material for seal plate 50 is the same as the criteria for selecting the peripheral metal seal 33 around cathode compartment 30.

It is preferable to release sodium from the anode compartment to the surface of the electrolyte beta" alumina plate at a controlled rate. Thus, in one embodiment of the invention, battery cell 70 includes transferring means in the anode compartment to transfer sodium to the anode side of the beta" alumina plate. As embodied in FIG. 9, transferring means includes a metal mesh 56, which wicks sodium from anode compartment 40 to the anode side of beta" alumina plate 20. Metal mesh 56 is welded to seal plate 50. Metal mesh 56 also functions as part of an electric current collector with seal plate 50, and in addition may function as an intermediate support member for the beta" alumina. A thin sheet of porous alumina paper or grafoil material 57 can be compressed between mesh 56 and beta" alumina plate 20 to encourage uniform wetting of beta" alumina plate 20.

Figure 13:
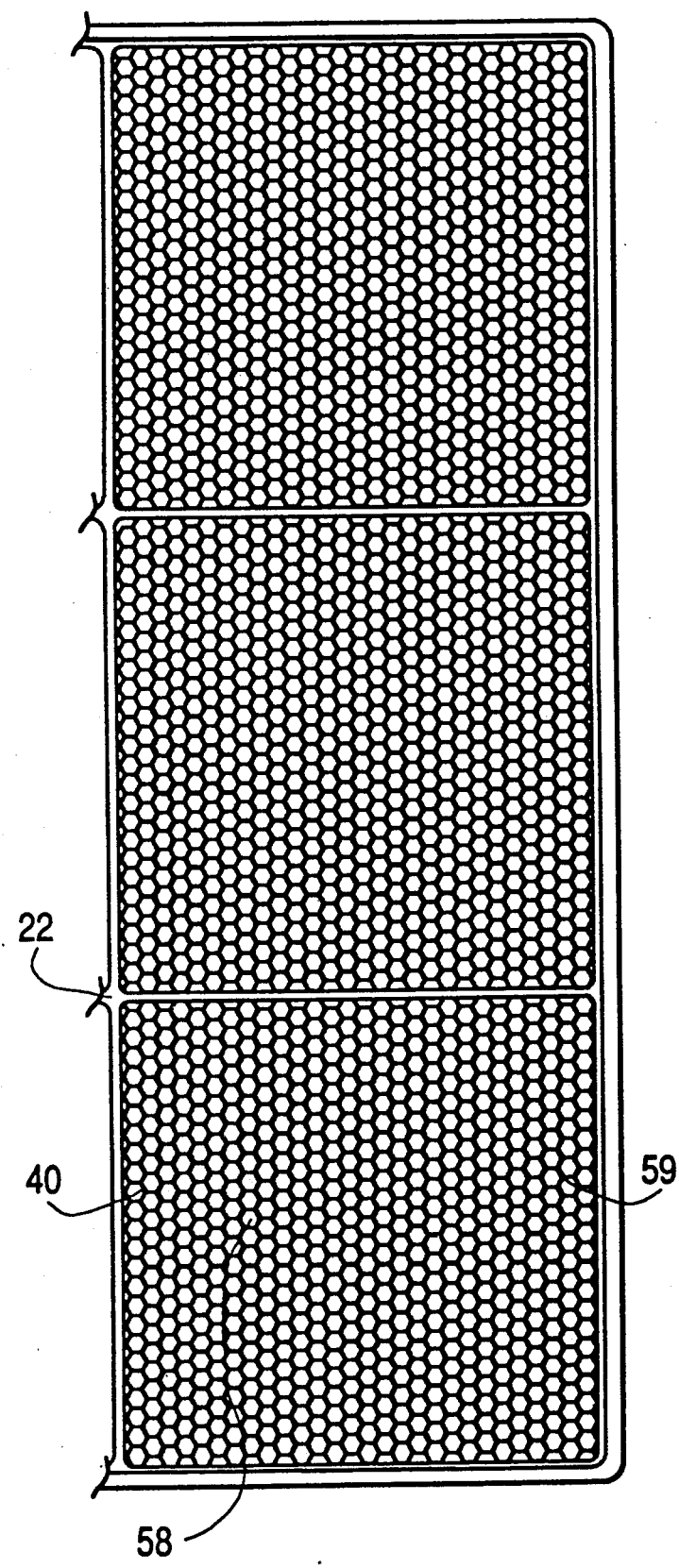
FIG. 13 is a plan view of a plurality of adjoining electrochemical battery cells, depicting an optional means for transferring sodium to the beta" alumina separator within the anode compartment, in accordance with the invention.

In accordance with the invention, an optional transfer means includes a compatible metal honeycomb structure. As embodied for example in FIG. 13, honeycomb matrix 58 replaces metal mesh 56 and thin sheet material 57. The open ends of matrix 58 are fine pores 59, which tend to retain sodium and limit the rate at which sodium transfers to beta" alumina plate 20. If beta" alumina plate 20 were to fracture, honeycomb matrix 58 would also function as a safety feature, by limiting the rate at which the sodium could react with the cathode.

The configuration of the cathode compartment 30 and anode compartment 40 have been broadly described with reference to a single cathode and anode compartment, connected via rectangular windows of beta" alumina plate 20 in the multiple adjoining rectangular openings 25 of frame 22. It is also within the scope of the invention, however, for a plurality of discrete anodes to be provided with a common cathode. In such an embodiment, the sodium anode fits neatly into openings 25 in frame 22 on the anode side of beta" alumina plate 20. The sulfur or nickel chloride cathodes 42 may be composed of small rectangular plaques disposed in contact with respective portions of the cathode side of beta" alumina plate 20 in openings 25 of frame 22. However, the cathode compartment is still common due to peripheral metal seal 33. The compartmentalization of the discrete anodes may provide additional benefits.

Figure 12:
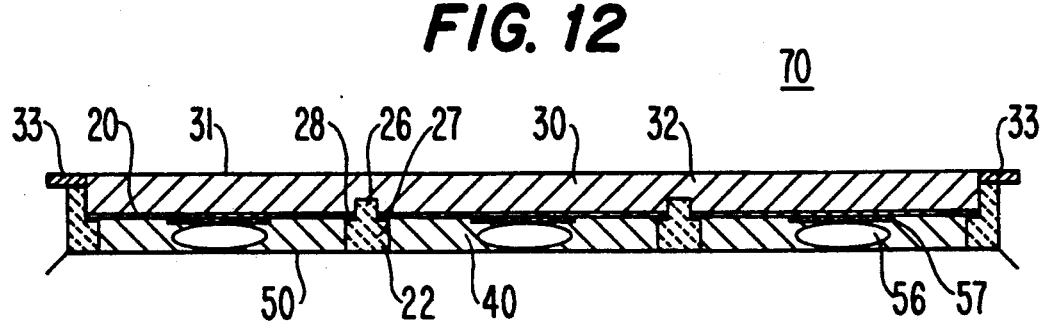
FIG. 12 is a cross-sectional view of yet another embodiment of an electrochemical battery cell in accordance with the invention, using the frame and beta" alumina separator plates of FIGS. 6–8.

As embodied in FIG. 12, frame 22 includes inner peripheral ledge 28 within each opening 25. Beta" alumina plates 20 are glass bonded to each ledge 28. Seal plate 50 is bonded to the periphery of frame 22 at lower rectangular portion 27, enclosing the sodium anode in adjoining anode compartments 40. Cathode compartment 30 is disposed adjacent upper rectangular portions 26 of frame 22. In the embodiment of FIG. 12, seal plate 50 is bonded to the lower portion 27 of frame 22 to allow the seal plate to be installed first, followed by installation of beta" alumina plates 20, thereby permitting access for insertion of the cathode.

Figure 14:
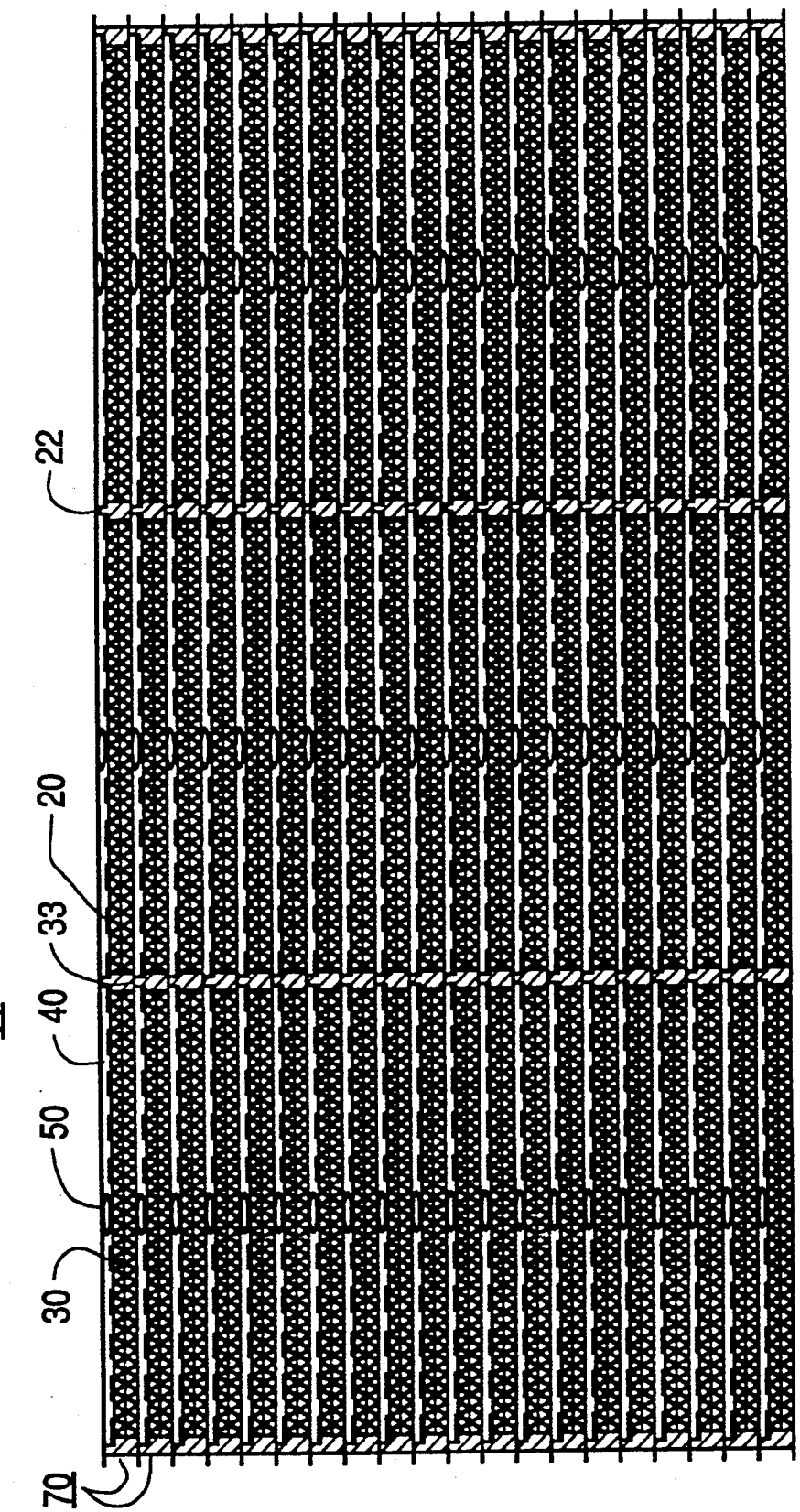
FIG. 14 is a cross-sectional view of a stack of electrochemical battery cells forming a battery in accordance with the invention, using the frame and beta" alumina separator plates of FIG. 6.

In accordance with the present invention, the sodium metal battery cells are stacked and electrically connected to comprise a sodium metal battery. As embodied in FIG. 14, a sodium metal battery 80 includes a plurality of stacked electrochemical battery cells 70. Each stacked battery cell 70 includes beta" alumina separator plate or plates 20, bonded to frame 22. Adjoining anode compartments 40 are sealed by seal plate 50 as described above. When the electrochemical battery cells 70 are stacked, seal plate 50 is welded to the neighboring metal frame seal 33, which extends beyond the periphery of frame 22 for ease of welding, thereby serving to seal the cathode compartment 30 of the neighboring cell. For this reason, the metal for the seal plate 50 is selected according to the same considerations used to select cathode compartment metal frame seal 33 described earlier. The use of only a single separator plate 50 between stacked cells 70, functioning both to seal the anode compartment 4 of the cells above and cathode compartment 30 of the cells below, reduces the overall weight of battery 80.

Preferably, the stacked battery cells 70 are connected in a series. The battery 80 may include 20-25 monolithic frames stacked vertically with four such cell stacks connected electrically in series to supply the full electrical potential of battery 80. However, the present invention is not limited to such a configuration.

In the electrochemical battery of the present invention, metal chloride is preferred as the cathode 42. When sodium metal chloride cells fail, they inherently fail in a shorted condition, which in a stacked series arrangement provides an electric bridge through the failed cell, allowing the remaining cells in the stack to continue to operate. Sodium sulfur cells, on the other hand, tend to fail in an indeterminate state, thereby requiring some external means to affect a short circuit.

Figure 15:
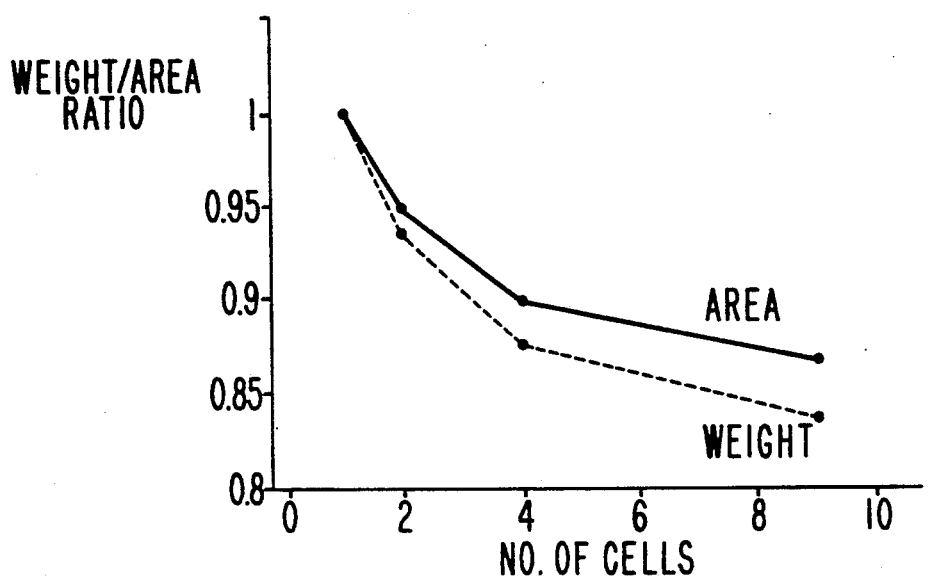
FIG. 15 is a graphic view depicting a savings in overall battery weight and area for the present invention as a function of the number of cells integrated into the structure and FIG. 16 depicts a calculation of maximum electrolyte size providing the available size dimension of an electrochemical battery cell in accordance with the present invention.

The present invention overcomes the need for discrete cells utilizing discrete beta" alumina plates which must either span larger lengths in order to provide the required battery capacity, or be broken up into smaller separate units, resulting in less efficient packing within the battery. One of the benefits of the multi-plate design is a reduction in the peripheral seal area over discrete cells by a factor determined by the square root of the number of beta" alumina plates included on the monolithic frame. An analysis of the savings in overall battery weight and area is shown graphically in FIG. 15 as a function of the number of beta" alumina plates integrated into the design.

The electrochemical battery cell described herein has a very low internal resistance to sodium ion flow due to the thinness of the beta" alumina electrolytes, providing high power. The beta" alumina plates are strengthened by a monolithic alpha alumina frame, maintaining reliability of the cell. A stack of such cells form an electrochemical battery which provides a large electrical capacity and increased power, without excessive battery weight or area. The separator plates themselves can be manufactured easily and inexpensively. Therefore, the electrochemical battery cell according to the present invention is an ideal candidate for use in a vehicle having electric propulsion, such as an electric automobile. Similar applications requiring a battery with high potential and power, combined with reduced size and weight, are conceivable by those skilled in the art.

Additional advantages and modifications will readily occur to those skilled in the art. The invention in its broader aspects is, therefore, not limited to the specific details shown and described. Departures may be made from such details without departing from the scope of the applicant's general inventive concept.

What is claimed is:

1. An electrochemical battery cell, comprising:
    a flexible beta" alumina plate serving as an electrolyte;
    rigid frame means for supporting said beta" alumina plate, including an outer peripheral portion and at least one central portion defining at least two adjoining generally rectangular openings, said frame means having planar surfaces on opposite sides, said beta" alumina plate being fixed to one surface of said frame means;
    a cathode compartment disposed on one side of said frame means and beta" alumina plate partially enclosing a cathode;
    an anode compartment disposed on the opposite side of said frame means and beta" alumina plate partially enclosing sodium; and a metallic seal plate sealing said anode compartment, said seal plate including an electric current collector.

2. An electrochemical battery cell according to claim 1, wherein said frame means includes a flat molded monolithic ceramic frame defining said at least two adjoining rectangular openings.

3. An electrochemical battery cell according to claim 2, wherein said frame is alpha alumina.

4. An electrochemical battery cell according to claim 1, wherein said cathode is sulfur.

5. An electrochemical battery cell according to claim 1, wherein said cathode is a metal chloride.

6. An electrochemical battery cell according to claim 1, wherein said cathode is a metal chloride selected from the group consisting of nickel chloride and iron chloride.

7. An electrochemical battery cell according to claim 1, wherein said cathode compartment includes a metallic frame seal attached at the periphery of said frame mean extending beyond said frame means for attaching to another metallic seal plate.

8. An electrochemical battery cell according to claim 1, further including transferring means disposed in said anode compartment to transfer said sodium to said beta" alumina plate.

9. An electrochemical battery cell according to claim 8, wherein said transferring means include a honeycomb structure, having a plurality of pores for releasing said sodium at a controlled rate to said beta" alumina plate.

10. An electrochemical battery cell comprising:
at least two generally rectangular flexible beta" alumina plates serving as an electrolyte;
a rigid frame means for supporting said beta" alumina plates, including a plurality of portions defining at least two adjoining rectangular openings, said frame means having opposite sides, said beta" alumina plates being fixed in said openings;
a cathode compartment disposed on one side of said frame means enclosing a cathode;
an anode compartment disposed on the opposite side of said frame means partially enclosing sodium; and
a metallic seal plate sealing said anode compartment, said seal plate including an electric current collector.

11. An electrochemical battery cell according to claim 10, wherein said frame means includes a molded monolithic flat ceramic frame defining said at least two rectangular openings.

12. An electrochemical battery cell according to claim 11, wherein said frame is alpha alumina.

13. An electrochemical battery cell according to claim 10, wherein said cathode is sulfur.

14. An electrochemical battery cell according to claim 10, wherein said cathode is a metal chloride.

15. An electrochemical battery cell according to claim 10, wherein said cathode is a metal chloride selected from the group consisting of nickel chloride and iron chloride 16. An electrochemical battery cell according to claim 10, wherein said cathode compartment includes a metallic frame seal attached at the periphery of said frame means extending beyond said frame means for attaching to another metallic seal plate.

17. An electrochemical battery cell according to claim 10, further including transferring means disposed in said anode compartment to transfer said sodium to said at least two beta" alumina plates.

18. An electrochemical battery cell according to claim 17, wherein said transferring means includes a honeycomb structure, having a plurality of pores for releasing said sodium at a controlled rate to said at least two beta" alumina plates.

19. An electrochemical battery cell according to claim 10, wherein said at least two adjoining rectangular openings have an inner peripheral surface and a peripheral ledge extending around the circumference of each said inner peripheral surface.

20. An electrochemical battery cell according to claim 19, wherein said at least two beta" alumina plates are fixed in said adjoining openings to said respective peripheral ledges.

21. A separator for use as an electrolyte in electrochemical battery cell comprising:
a flexible beta" alumina plate having opposite surfaces, each surface having a peripheral edge portion; and
rigid monolithic frame means for supporting said beta" alumina plate, including a plurality of portions defining at least two adjoining rectangular openings, fixed to one surface of said beta" alumina plate.

22. A separator according to claim 21, wherein said frame means includes a flat molded monolithic ceramic frame.

23. A separator according to claim 22, wherein said frame is alpha alumina.

24. A separator according to claim 21, wherein said one surface of said beta" alumina plate is fixed to said frame means at said peripheral edge portion.

25. A separator for use as an electrolyte in an electrochemical battery cell, comprising:
at least two generally rectangular flexible beta" alumina plates having opposite surfaces; and
rigid monolithic frame means for supporting said at least two beta" alumina plates, including a plurality of portions defining at least two adjoining rectangular openings, fixed to one respective surface of said at least two beta" alumina plates.

26. A separator according to claim 25, wherein said frame means includes a flat molded monolithic ceramic frame.

27. A separator according to claim 26, wherein said frame is alpha alumina.

28. A separator according to claim 25, wherein said at least two beta" alumina plates are fixed to said frame means covering said adjoining rectangular openings.

29. A separator according to claim 25, wherein said at least two beta" alumina plates are fixed to said frame means within an inner periphery of said adjoining rectangular openings.

30. A separator according to claim 25, wherein said rectangular openings each include a continuous inner peripheral ledge.

31. A separator according to claim 30, wherein said at least two beta" alumina plates are fixed to said continuous inner peripheral ledges.

32. An electrochemical battery including a stack of cells, each cell comprising:
a flexible beta" alumina plate serving as an electrolyte;
rigid frame means for supporting said beta" alumina plate, including an outer peripheral portion and at least one central portion defining at least two adjoining generally rectangular openings, said frame means having planar surfaces on opposite sides, said beta" alumina plate being fixed to one surface of said frame means;

a cathode compartment disposed on one side of said frame means and beta" alumina plate partially enclosing a cathode;

an anode compartment disposed on the opposite side of said frame means and beta" alumina plate partially enclosing sodium; and a metallic seal plate sealing said anode compartment, said seal plate including an electric current collector, wherein each metallic seal plate also seals a cathode compartment of a successive cell in the stack.

33. An electrochemical battery according to claim 32, wherein a plurality of stacks are connected electrically.

34. An electrochemical battery cell according to claim 32, wherein said cathode is sulfur.

35. An electrochemical battery according to claim 32, wherein said cathode is a metal chloride.

36. An electrochemical battery according to claim 32, wherein said cathode is a metal chloride selected from the group consisting of nickel chloride and iron chloride.

37. An electrochemical battery according to claim 32, wherein said cathode compartment includes a metallic frame seal attached at the periphery of said frame means extending beyond said frame means for attaching to a successive metallic seal plate.

38. An electrochemical battery according to claim 32, further including means disposed in each said anode compartment, for transferring said sodium into contact with said beta-alumina" plate.

39. An electrochemical battery according to claim 38, wherein said transferring means includes a matrix configured as a honeycomb, having a plurality of pores for releasing said sodium at a controlled rate to said beta-alumina" plate.

40. An electrochemical battery according to claim 32 wherein said frame means includes a flat molded monolithic ceramic frame.

41. An electrochemical battery according to claim 40, wherein said frame is alpha alumina.

* * * * *